(No Model.)

L. J. HIRT.
TROLLEY WHEEL.

No. 488,811.  Patented Dec. 27, 1892.

Witnesses:

Inventor
Louis J. Hirt
By Maynacher & Beach
his attorneys.

UNITED STATES PATENT OFFICE.

LOUIS J. HIRT, OF ARLINGTON, MASSACHUSETTS.

TROLLEY-WHEEL.

SPECIFICATION forming part of Letters Patent No. 488,811, dated December 27, 1892.

Application filed July 28, 1892. Serial No. 441,543. (No model.)

*To all whom it may concern:*

Be it known that I, LOUIS J. HIRT, of Arlington, in the county of Middlesex and State of Massachusetts, have invented an Improved Trolley-Wheel, of which the following is a specification, reference being had to the accompanying drawings, making a part hereof.

Figure 3:
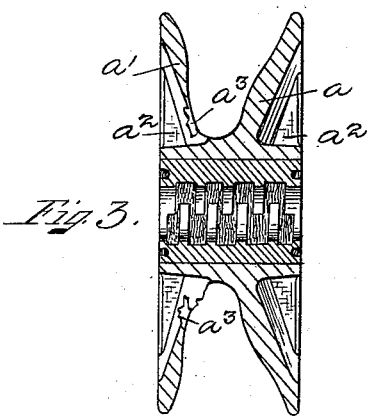

Trolley wheels have a groove about their peripheries to receive the trolley wire, and this groove wears rapidly. Were the wear always in a plane at right angles to the axis, as was the theory, the life of the wheel could be much prolonged by simply increasing its diameter measured from the bottom of the groove on one side to the bottom of the groove on the other side. But in practice it is found that the wear is to one side as well as toward the axis, as shown in Fig. 3, which is a cross-section of one of my trolley wheels which has been worn out; and this wear is practically unavoidable. The result is that when the groove gets too much to one side the trolley wire is cramped in the groove and the friction becomes too great so that the wear is greatly increased; moreover the wheel cannot revolve as freely as it should; and greatly strains the trolley wire.

The object of my invention is to provide a trolley wheel which will when on the trolley pole give ocular proof when it is too much worn, and my invention is a trolley wheel with ribs connecting its hub and the walls of the groove, the thickness of the walls of the groove being such that when the side wear becomes too much the wall will be cut through between the ribs or spokes, and allow light to pass through, so that the inspector can readily see, as any car leaves a car house whether the trolley wheel needs renewal or not.

Figure 1:
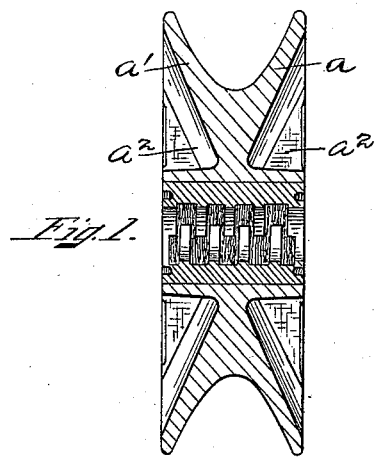
Figure 2:
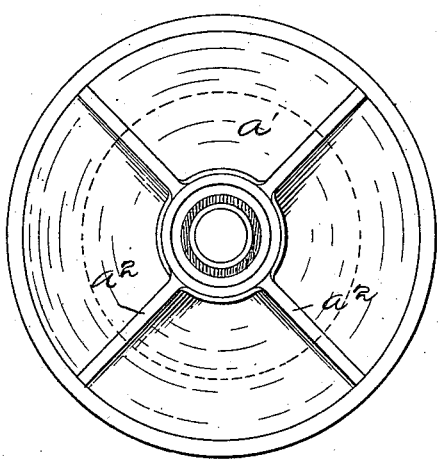
Figure 5:
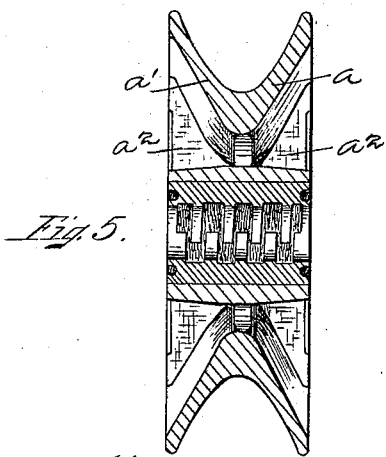
Figure 6:
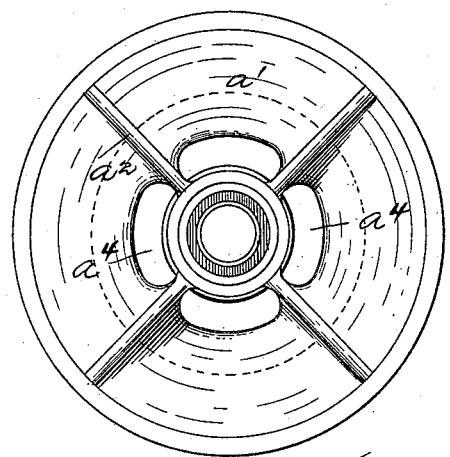

In the drawings, Figure 1 is a cross section of one of my improved trolley wheels unworn, and Fig. 2 a side elevation thereof. Fig. 3 is a section, and Fig. 4 a side elevation of a like wheel after it has worn out. Figs. 5 and 6 are like views of a modified form.

Figure 4:
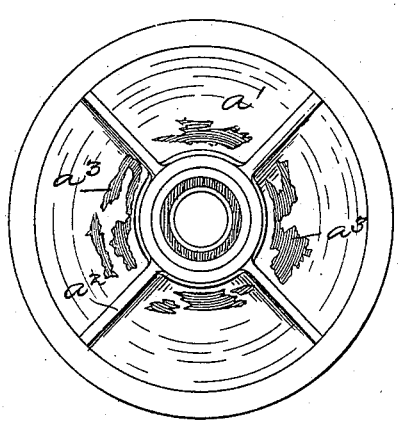

My wheel is of usual construction except that care is taken to make the walls $a$ $a'$ of the groove so thin near the bottom of the groove, that any side wear sufficient to make the wheel cramp badly on the trolley wire will break through, and the wall on that side marked $a'$ in the drawings, would fall from the wheel were it not for the spokes or ribs $a^2$, which support the wall $a'$ even when worn through at $a^3$ as shown in Figs. 3 and 4. As the side wear on wall $a'$ progresses the wall gets thinner and thinner, but the ribs $a^2$ hold it securely, and the wheel works just as well as if it were unworn until the side wall $a'$ where not supported by the ribs $a^2$ breaks away, as shown in Figs. 3 and 4; when the inspector can see at a glance that the wheel is no longer fit for practical use; for although the wheel shown in Figs. 3 and 4 is still practically efficient yet any greater side wear would make it seriously objectionable.

The advantages of my improvement will be obvious when it is considered that trolley wheels used before my invention required close inspection to determine whether the side wear had become too great or not; and the absence of such inspection often resulted in injury to the wheel or trolley wire or both; in some cases the wall corresponding to wall $a'$ of my wheel becoming detached from the wheel making it impossible to keep the wheel on the wire, and stopping the car. With my wheel the wall $a'$ may be broken through while the car is at its farthest distance from the car house, but the wheel will still serve as well as before for many miles, although its need of removal will be visible.

Practically my invention has proved itself a complete remedy for the serious difficulties incident to the use of all other forms of trolley wheels known to me; which are all alike so far as concerns the need of constant inspection to make sure that the side wear of the groove has not become excessive; and so far as concerns the practical impossibility of providing for that inspection when the wheels are mounted at the upper end of a long trolley pole.

In Figs. 5 and 6, the metal between hub and rim is removed, as at $a^4$ making the wheel lighter; and this is on the whole a better form, as the side wear will when excessive make larger apertures $a^3$, which will cause the wheel to spark and attract the attention of the car inspector.

I do not of course claim broadly a grooved wheel with spokes, but making the walls of the groove thin near the bottom of the groove so that any great side wear will cut through them, and supporting them by spokes or ribs is new with me; and it is these two features combined that constitute my invention; for obviously making the side walls thin near the bottom of the groove would in itself prevent excessive side wear; but the wall $a'$ would fall off as soon as the side wear had cut through it, were it not for the ribs $a^2$ which hold wall $a'$ in place, after the side wear cuts through.

What I claim as my invention is:

The improved trolley wheel above described having the walls $a\ a'$ of the groove made thin near the bottom of the groove, and reinforced by the ribs $a^2$, whereby side wear will become visible from the outside of the wheel, while the wheel is still effective; all substantially as and for the purpose specified.

LOUIS J. HIRT.

Witnesses:
JONATHAN CILLEY,
JOHN R. SNOW.